United States Patent [19]

Beltrami

[11] 3,815,089

[45] *June 4, 1974

[54] ANTI-HIJACKING VEHICULAR ALARM SYSTEM WITH TIMER CONTROLLED ALARM CIRCUIT

[75] Inventor: Joseph P. Beltrami, Garfield, N.J.

[73] Assignee: ITAD Alarm Systems, Inc., Garfield, N.J.

[ * ] Notice: The portion of the term of this patent subsequent to Apr. 11, 1989, has been disclaimed.

[22] Filed: Dec. 28, 1971

[21] Appl. No.: 213,017

[52] U.S. Cl............... 340/64, 180/114, 307/10 AT
[51] Int. Cl............................................. B60r 25/10
[58] Field of Search ................... 340/64, 63, 62, 53; 307/10 AT; 180/114

[56] References Cited
UNITED STATES PATENTS

| | | | |
|---|---|---|---|
| 3,203,501 | 8/1965 | Carter et al. | 340/53 |
| 3,639,897 | 2/1972 | Teich | 340/64 |
| 3,656,100 | 4/1972 | Beltrami | 340/63 |
| 3,659,266 | 4/1972 | Meyerle | 180/114 |

Primary Examiner—John W. Caldwell
Assistant Examiner—Glen R. Swann, III
Attorney, Agent, or Firm—Samuelson & Jacob

[57] ABSTRACT

An anti-hijacking vehicular alarm system in which the vehicle alarm circuit may be activated only for a preselected interval of time, the duration of which interval cannot be shortened once selected such that the vehicle cannot be operated without activation of the alarm circuit, and the alarm circuit, once activated, cannot be deactivated at will. Where the vehicle has an ignition circuit, the ignition circuit is activated only upon activation of the vehicle alarm circuit.

10 Claims, 3 Drawing Figures

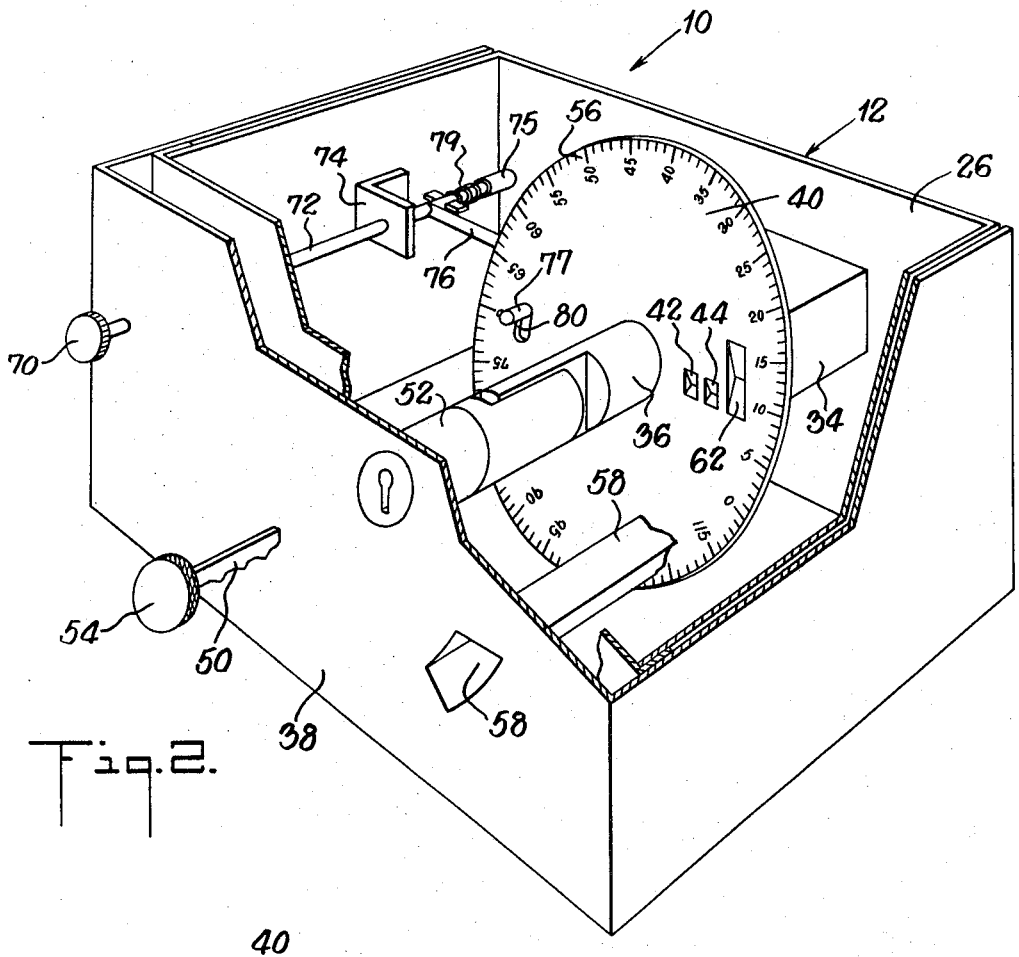

ANTI-HIJACKING VEHICULAR ALARM SYSTEM WITH TIMER CONTROLLED ALARM CIRCUIT

BACKGROUND OF THE INVENTION

1. Field of the Invention

The present invention relates generally to vehicular alarms and pertains more specifically, to an alarm system especially suited for the prevention of the hijacking of trucks and like vehicles.

2. Description of Prior Art

Alarm systems are presently available for the purpose of warding off the burglary or theft of vehicles such as cars and trucks; however, these systems are not effective against hijacking. Thus, in some commercially available systems for trucks, for example, the cab of the truck is protected by an alarm which is responsive to the opening of a cab door. The driver of the truck may set or activate the alarm to operate either while he is in the cab or after he has left the cab so that any unauthorized opening of a cab door will actuate or sound the alarm. Since such a system is always under the direct control of the driver, an armed hijacker can compel the driver to totally deactivate or in some way defeat the operation of the alarm prior to entry of the hijacker into the truck. In addition, the driver often neglects to activate the alarm system while he is present in the truck, thereby defeating any value the system may otherwise have in a hijacking incident.

Other systems are available which operate an alarm in response to unauthorized starting of the engine of the vehicle. In these systems, a special key-operated electrical switch is placed in the vehicle's ignition circuit. Any attempt to start the engine without first inserting the special alarm key and operating the switch results in the sounding of an alarm. Here, again, the driver of the vehicle is in possession of the special alarm key and may be compelled to use it, thus rendering such a system ineffectual against hijackers.

Thus, although presently available vehicle alarm systems may offer some degree of protection against the theft or pilfering of an unattended vehicle, such systems offer little or no protection against hijacking, presently one of the largest of cargo loss factors.

SUMMARY OF THE INVENTION

It is therefore an important object of the invention to provide a vehicular alarm system which is effective against hijacking.

Another object of the invention is to provide a vehicular alarm system which exhibits all of the advantages of present alarm systems in preventing theft and burglary, but also achieves protection against hijacking.

A further object of the invention is to provide a vehicle alarm system which achieves protection against hijacking by assuring that the alarm system is activated while the vehicle is in operation and by seeing to it that the vehicle operator cannot deactivate the alarm system at will so that he cannot be compelled by a hijacker to deactivate the system.

A still further object of the invention is to provide a vehicular alarm system as set forth above which is relatively inexpensive and is easy to install and use.

The above objects as well as still further objects and advantages, are attained by the invention which may be described briefly as an anti-hijacking vehicular alarm system in which an alarm is to be actuated upon unauthorized opening of a door of the vehicle, the alarm system comprising alarm circuit means for actuating the alarm in response to the opening of a vehicle door when that means is activated, timer means capable of being actuated for a selected interval of time, the timer means being constructed such that the duration of the interval, once selected, cannot be shortened, and means responsive to activation of the timer means for activating the alarm circuit means for the duration of the interval of time such that the alarm circuit means must remain activated for the duration of the interval.

BRIEF DESCRIPTION OF THE DRAWING

The invention will be more fully understood and still further objects and advantages will become apparent from the following detailed description of an embodiment of the invention illustrated in the accompanying drawing, in which:

FIG. 2 is a front perspective view of the control portion of the alarm system of FIG. 1, partially cut away to show internal components thereof; and FIG. 3 is a fragmentary rear perspective view of component parts of the control portion of FIG. 2.

DESCRIPTION OF THE PREFERRED EMBODIMENT

Figure 1:
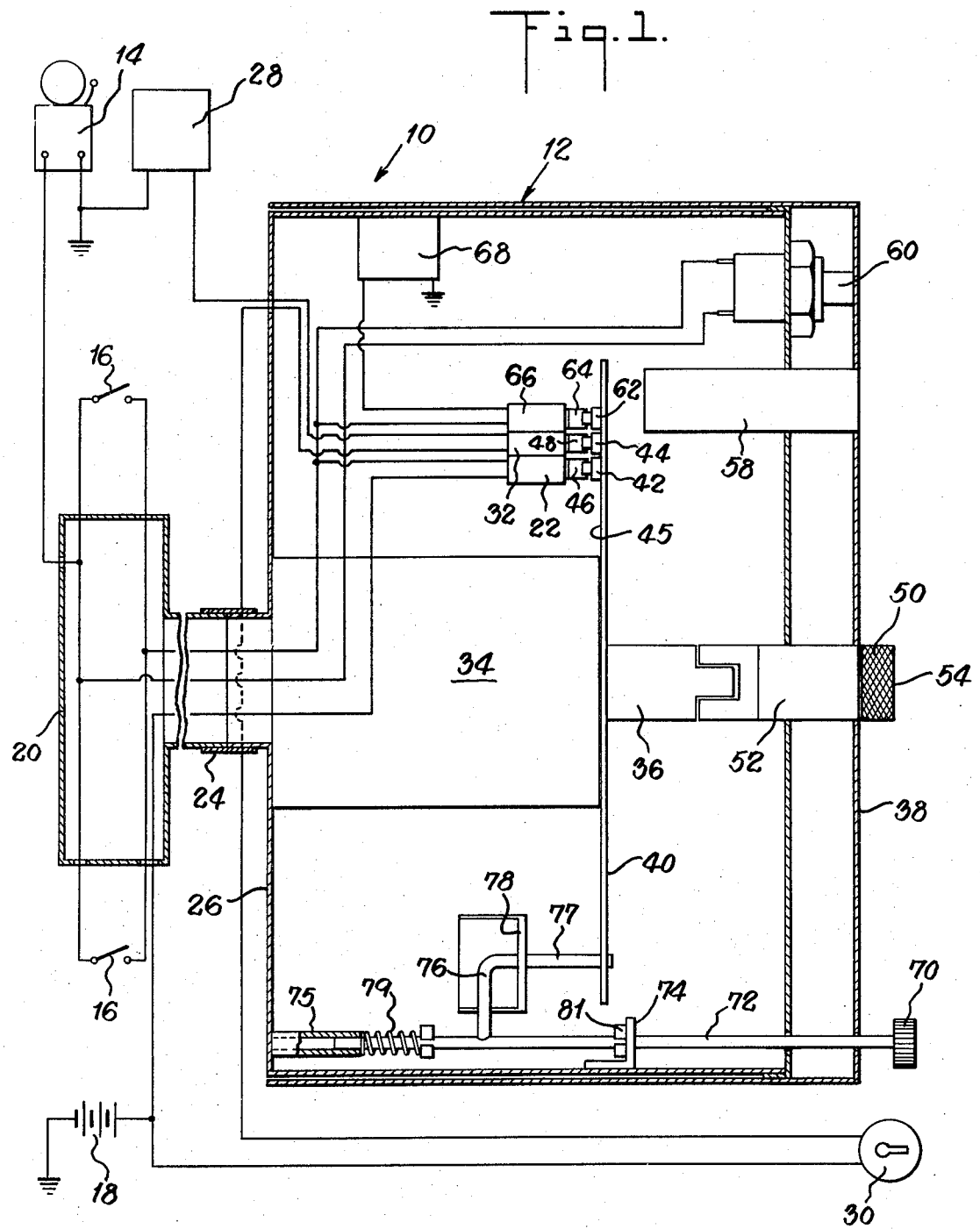
FIG. 1 is a partially schematic plan view of an alarm system constructed in accordance with the invention.

Referring now to the drawing, and especially to FIG. 1 thereof, a vehicular alarm system 10 constructed in accordance with the invention is illustrated schematically and includes a control box 12 which is shown in a sectional plan view. The control box 12 is placed in a location within the vehicle where the operating controls of the box may be manipulated readily from the vehicle operator's normal operating position.

Alarm system 10 is constructed for use in a truck having two cab doors. The system includes an audible alarm in the form of alarm bell 14 which is to be actuated by either one of two switches 16, each of which is located in the cab, one so as to be operated in response to the opening of one of the two doors of the cab and the other so as to be operated in resonse to the opening of the other of the two doors.

Electric power for actuation of the alarm bell 14 is supplied by the vehicle battery 18 which is connected into the alarm circuit through connections in a junction box 20. As seen by observation of the connections in the junction box 20, neither of the switches 16 is effective to actuate the alarm bell 14 unless the alarm circuit is activated by closing an alarm circuit activation switch 22 in the control box 12 which is located in the cab of the truck and is electrically connected with the junction box 20 through an armored cable 24 extending from the rear wall 26 of the control box 12. Thus, when switch 22 is in the closed position the opening of either cab door will close one or the other of switches 16 and sound the alarm bell 14.

In this instance, the vehicle has an ignition circuit 28 and the alarm system is arranged so that the ignition circuit 28 of the vehicle may be operated by the vehicle ignition switch 30 only when the ignition circuit is activated by closing an ignition circuit activation swich 32 located in the control box.

As best seen in FIGS. 2 and 3, as well as in FIG. 1, the switches 22 and 32 are closed by the selected actuation of timer means illustrated in the form of a clocktimer 34 affixed to the rear wall 26 of the control box 12 and coupled to an actuator means shown in the form of a key-operated shaft 36 which extends through the front wall 38 of the control box 12 and which carries a timing member in the form of a timing disk 40 affixed to the shaft 36 for rotation therewith.

When the clock-timer 34 is at rest, the switches 22 and 32 are and remain open by virtue of the respective engagement of camming means in the form of projections 42 and 44 on the back face 45 of the timing disk 40 with switch actuating arms 46 and 48 of the respective switches 22 and 32, as best seen in FIG. 3. Thus, in this rest position of the timing disk 40, both the alarm circuit and the ignition circuit are inactive and the cab doors may be opened without sounding the alarm bell, but the vehicle engine cannot be started. The position is designated as the "zero" time position.

Actuation of the clock-timer 34 is accomplished by insertion of a special alarm key 50 into a barrel portion 52 of the shaft 36 and roating the key and shaft in a clockwise direction, as viewed in FIG. 2, by turning the head 54 of the key 50. Such rotation of the shaft 36 will rotate the timing disk 40 to move the projections 42 and 44 out of engagement with switch actuating arms 46 and 48 allowing switches 22 and 32 to be actuated to their normally closed position, thereby activating the alarm circuit and activating the ignition circuit. It is noted that the alarm system 10 will ordinarily include at least one external point (not shown) where alarm key 50 can be inserted to either activate or deactivate the alarm system independent of the rotation of the timing disk so the system may be employed to guard an unattended vehicle in the same manner as conventional vehicle alarm systems.

Timing disk 40 carries indicia 56 which may be viewed only through an elongate tunnel-like viewer 58, for purposes which will be explained hereinafter, and which correspond to the time required for the clock-timer 34 to return to its rest position and the timing disk 40 to return to its zero time position by counter-clockwise rotation. In this instance, the clock-timer will require two full hours to return the timing disk to the zero time position after one full clockwise rotation of the shaft 36.

The clock-timer 34 is of the type which cannot be rotated manually in a counterclockwise direction and hence cannot be returned toward its rest position, but must time out over the chosen interval in order to return. Clock-timers of the type required are commercially available. One such timer is manufactured by Tork Timer Mfgs. of Connecticut. Thus, once an interval of time is selected by clockwise rotation of the shaft 36 through either one full rotation or any part of one full rotation, the alarm circuit and the ignition circuit of the vehicle must remain activated for at least the duration of the chosen interval. During the interval, the timing disk 40 is rotated counterclockwise by the clock-timer at a precisely timed pace, carrying the projections 42 and 44 along a path of travel which will allow them to be intercepted by the actuating arms 46 and 48 of the switches 22 and 32 when the timed interval is completed.

Additionally, the barrel portion 52 which receives the alarm key 50 will not permit removal of the key until the clock-timer 34 returns to its rest position and the timing disk 40 is returned to the zero time position.

In using the alarm system 10, the driver of a truck equipped with the alarm system will enter the cab of the truck, after having deactivated the alarm system externally with the alarm key 50, if necessary. He will then insert the alarm key 50 into the barrel portion 52, estimate the time he will spend operating the vehicle until his next stop and then turn the key until he views the estimated time on the timing disk 40 through the viewer 58. By so turning the key 50 and the timing disk 40, the alarm circuit is activated, the ignition circuit is activated and the clock-timer 34 begins to meter the pre-selected interval corresponding to the estimated time set by the driver. The ignition switch 30 may now be used, the engine can be started and the truck driven off.

Should a hi-jacker attempt to hi-jack the truck by stopping the truck and opening a cab door, a switch 16 will be activated to sound alarm bell 14. Should the hi-jacker attempt to coerce the driver into passing the alarm key 50 out of the cab so that the alarm can be deactivated from an aforementioned external point, he will be unsuccessful since the key 50 is captured within the barrel portion 54 as long as the alarm system is activated.

Should the hi-jacker attempt to determine how much time remains in the duration of the interval so as to evaluate whether or not it would be feasible for him to wait until the clock-timer returns to the rest position, he will be unable to observe the indicia 56 on the timing disk 40 from his position outside the cab of the truck since the elongate tunnellike viewer 58 requires that the observer be aligned practically directly in front of the control box 12 and the hijacker's position is not so aligned.

Since the head 54 of the alarm key 50 is round, there is no indication of elapsed time or duration remaining in the interval by any orientation of the key head 54.

Should the hi-jacker attempt to open or destroy the control box 12 by impact, an impact-responsive switch 60 placed behind the front panel 38 will sense the impact and actuate the alarm to sound the alarm bell 14.

Thus, the hi-jacker should find that the alarm system 10 presents a sufficient deterrent to his quick entry into the truck and quick departure with the goods carried by the truck to discourage him from carrying out the hi-jacking.

Assuming now that no potential hi-jacking incident has taken place or that any potential hi-jacking incident has failed, the truck will approach its destination and the clocktimer will approach its rest position. As the timing disk 40 reaches the "10 second" position, that is, the position where only 10 seconds remain in the pre-selected interval, a further camming means in the form of projection 62 on the timing disk 40 will be intercepted by an actuator arm 64 of a further electrical switch 66, and the switch 66 will be closed to sound a 10-second warning buzzer 68. In this instance, the projection 62 is located at a position corresponding to 10 seconds ahead of the projections 42 and 44 so that switch 66 will be actuated 10 seconds prior to actuation of switches 22 and 32. If the truck has not reached its destination when warning buzzer 68 sounds, the driver can estimate how much more time is necessary and can reset the clock-timer to increase the duration of the interval by merely turning the alarm key 50 in a clockwise direction. In this manner, the ignition circuit will not be interrupted without warning.

When it becomes necessary to maneuver the truck for short periods, such as during loading and unloading operations, and the driver must pay close visual attention to operation of the truck and not to continual resetting of the alarm system to keep the ignition circuit activated for short periods, the driver may take advantage of means provided for positively limiting the displacement of the timing disk 40 away from the rest position. These means are shown in the form of a 1-minute stop arrangement which includes a stop knob 70 affixed to a push rod 72 carried for axial sliding movement within a bracket 74 mounted upon a side wall of the control box 12 and a sleeve 75 affixed to the rear wall 26. A lateral arm 76 is integral with the push rod 72 and carries a stop finger 77 which is supported by a vertical brace 78 and is resiliently biased toward the front panel of the control box by a helical spring 79 so as to be received within a slot 80 in the timing disk 40. When the stop finger 77 is in the slot 80, rotation of the timing disk 40, and hence of the clocktimer 34, is limited by the length of the slot 80. A pin 81 assures that push rod 72 is biased no further forward than the position where pin 81 abuts bracket 74. By limiting the length of the slot 80 to the angular extent corresponding to one minute, it will be seen that the alarm key 50 can be turned clockwise to provide activation of the ignition circuit for one minute without requiring viewing of the indicia on the timing disk. Thus, the operator of the truck need merely reach out and turn the alarm key 50 without taking his eyes away from his maneuvers to feed a short interval of one minute into the alarm system and can do so consecutively, if necessary, each time the ten-second buzzer sounds, until such maneuvers are completed.

When the clock-timer is to be set for an interval greater than one minute, as would be the case prior to a trip, the stop knob 70 is depressed to retract the stop finger 77 from the slot 80 and permit unrestricted clockwise rotation of the timing disk and the clocktimer through an almost full revolution of travel.

It will be apparent that the alarm system described above provides protection against hijacking, as well as against ordinary stealing and burglary, in that the alarm circuit cannot be deactivated by coercion of the operator of the vehicle and must be activated before the vehicle can be operated. When the vehicle is unattended, the alarm system may be activated externally, independent of the timing means, so as to serve in the same manner as a conventional vehicle alarm system.

It is to be understood that the above detailed description of a preferred embodiment of the invention is provided by way of example only. Various details of design and construction may be modified without departing from the true spirit and scope of the invention as set forth in the appended claims.

The embodiments of the invenion in which an exclusive property or privilege is claimed are defined as follows:

1. An anti-hijacking vehicular alarm system in which an alarm is to be actuated upon unauthorized opening of a door of the vehicle, said alarm system comprising:

alarm circuit means for actuating an alarm in response to the opening of a vehicle door when said means is activated;

timer means capable of being actuated for a selected interval of time, said timer means being constructed such that the duration of the interval, once selected, cannot be shortened; and means responsive to actuation of said timer means for activating said alarm circuit means for the duration of said interval of time such that the alarm circuit means must remain activated for the duration of said interval.

2. The alarm system of claim 1 wherein the vehicle includes an ignition circuit, the alarm system including means responsive to actuation of said timer means for activating the ignition circuit of the vehicle for the duration of said interval of time such that the ignition circuit is activated only when the alarm circuit means is activated.

3. The alarm system of claim 2 wherein:

the timer means includes a clock-timer, actuator means selectively movable manually from a rest position to a selected position and movable from said selected position to said rest position only in response to operation of said clock-timer over the duration of said timed interval, and a timing member movable with said actuator means;

said means for activating the alarm circuit means includes a first electric switch in the alarm circuit means responsive to the movement of said timing member; and said means for activating the ignition circuit includes a second electric switch in the ignition circuit responsive to the movement of said timing member;

said first and second electric switches rendering said alarm circuit means and said ignition circuit in activated condition while the timing member moves from the selected position toward the rest position.

4. The alarm system of claim 3 including means for selectively positively limiting the displacement of said actuator means to only a portion of the total movement available to the actuator means for selectively limiting said interval to only a portion of the full duration available for selection in the system.

5. The alarm system of claim 3 wherein:

the actuator means includes a rotatable shaft;

the timing member includes a timing disk rotatable with said shaft, and first camming means on the timing disk for movement along a prescribed path of travel as the timing disk rotates;

the first and second electric switches each include an actuator arm lying in the path of travel of the camming means for intercepting said camming means and actuating said first and second switches to deactivate the alarm circuit means and the ignition circuit when the timing disk is at said rest position.

6. The alarm system of claim 5 wherein said camming means include projections extending from a face of the timing disk.

7. The alarm system of claim 5 including key-operated means interengaged with said rotatable shaft such that said shaft may be manually rotated only when a corresponding alarm key is received within the key-operated means, and means for retaining said alarm key within said key-operated means during the duration of said interval.

8. The alarm system of claim 5 including means for warning of the expiration of said interval just prior to such expiration, said warning means including
   a third electric switch;
   a further actuator arm for actuating said third electric switch; and
   second camming means on the timing disk for movement along a path of travel and located with respect to said further actuator arm such that movement of the timing disk will move said further actuator arm to actuate said third electric switch prior to actuation of said first and second electric switches; and
   means responsive to actuation of said third electric switch for providing said warning.

9. The alarm system of claim 8 wherein said first camming means include first projections extending from a face of the timing disk for actuating said first and second switches and said second camming means include a second projection spaced angularly from said first projections such that said further actuator arm is engaged by said second projection prior to engagement of the actuator arms associated with said first and second switches.

10. The alarm system of claim 1 including means for warning of the expiration of said interval a relatively short time prior to such expiration.

* * * * *